US009733832B2

(12) United States Patent
Tan

(10) Patent No.: US 9,733,832 B2
(45) Date of Patent: Aug. 15, 2017

(54) BUFFER MEMORY ACCESSING METHOD, MEMORY CONTROLLER AND MEMORY STORAGE DEVICE

(71) Applicant: PHISON ELECTRONICS CORP., Miaoli (TW)

(72) Inventor: Kok-Yong Tan, Miaoli County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 102 days.

(21) Appl. No.: 14/825,178

(22) Filed: Aug. 13, 2015

(65) Prior Publication Data

US 2016/0364148 A1    Dec. 15, 2016

(30) Foreign Application Priority Data

Jun. 10, 2015 (TW) .............................. 104118750 A

(51) Int. Cl.
*G06F 3/06* (2006.01)

(52) U.S. Cl.
CPC .......... *G06F 3/0604* (2013.01); *G06F 3/0656* (2013.01); *G06F 3/0659* (2013.01); *G06F 3/0679* (2013.01)

(58) Field of Classification Search
CPC .... G06F 3/0656; G06F 3/0659; G06F 3/0611; G06F 3/0688; G06F 3/0679; G06F 3/0604
See application file for complete search history.

(56) References Cited

U.S. PATENT DOCUMENTS

| 2014/0337562 | A1* | 11/2014 | Long | G06F 3/0659 |
| | | | | 711/103 |
| 2015/0074065 | A1* | 3/2015 | Christ | G06F 3/067 |
| | | | | 707/692 |
| 2015/0280959 | A1* | 10/2015 | Vincent | H04L 67/1097 |
| | | | | 709/203 |

FOREIGN PATENT DOCUMENTS

| TW | 200931249 | 7/2009 |
| TW | 201303583 | 1/2013 |

* cited by examiner

*Primary Examiner* — Hashem Farrokh
(74) *Attorney, Agent, or Firm* — Jianq Chyun IP Office

(57) ABSTRACT

A method for accessing a buffer memory in a memory storage device is provided, wherein the buffer memory, which has a plurality of write buffer units, is equipped in the memory storage device having a rewritable non-volatile memory module. The method includes: receiving a write data from a host system and determining whether the number of used write buffer unit is smaller than a predefined value or not. The method also includes: if the number of the used write buffer unit is not smaller than the predefined value, temporarily storing the write data into one of the write buffer unit which is not being used and transmitting a confirmation message corresponding to the write data to the host system after a predefined time interval. Therefore, the method can reduce the latency of write operations of the host system.

18 Claims, 7 Drawing Sheets

BUFFER MEMORY ACCESSING METHOD, MEMORY CONTROLLER AND MEMORY STORAGE DEVICE

CROSS-REFERENCE TO RELATED APPLICATION

This application claims the priority benefit of Taiwan application serial no. 104118750, filed on Jun. 10, 2015. The entirety of the above-mentioned patent application is hereby incorporated by reference herein and made a part of this specification.

BACKGROUND

1. Technology Field

The disclosure relates to a management method of a buffer memory, and particularly relates to a buffer memory accessing method, a memory controller and a memory storage device.

2. Description of Related Art

The growth of digital cameras, mobile phones, and MP3 players has been rapid in recent years. Consequently, the consumers' demands for storage media have increased tremendously. Since rewritable non-volatile memory has the characteristics of data non-volatility, low power consumption, small volume, non-mechanical structure, and fast reading/writing speed, it fits well for portable electronic products, such as laptops. A solid state drive is a memory storage device using flash memory as a storage medium. Thus, flash memory has become an important part of the electronic industries.

In a memory storage device using non-volatile memory as a storage medium, a buffer memory is usually configured to serve as a temporary storage area for storing program codes, data, or data for background tasks performed by the memory storage device. Due to the consideration of cost, such buffer memory does not have a large storage space. However, under the circumstance that the storage space of the buffer memory is not enough, the operation of the memory storage device is influenced significantly. For example, when a write command and data from a host system cannot be timely written to the buffer memory, a time latency of writing of the host system may be too long, thus resulting in a time-out and interruption. Thus, how to keep the time latency of writing of the host system within a fixed period of time to avoid a time-out is an issue that people having ordinary skills in the art are working on.

Nothing herein should be construed as an admission of knowledge in the prior art of any portion of the present disclosure. Furthermore, citation or identification of any document in this application is not an admission that such document is available as prior art to the present disclosure, or that any reference forms a part of the common general knowledge in the art.

SUMMARY

The disclosure provides a buffer memory accessing method, a memory controller, and a memory storage device capable of reducing a time latency of a writing operation of a host system.

An exemplary embodiment of the disclosure provides a buffer memory accessing method. The buffer memory accessing method is suitable for a buffer memory of a memory storage device, where the memory storage device includes a rewritable non-volatile memory module and the buffer memory has a plurality of write buffer units. The buffer memory accessing method includes: receiving a write data from a host system, and determining whether a number of used write buffer units of the write buffer units is not smaller than a predefined value. The buffer memory accessing method also includes: temporarily storing the write data to one of the write buffer units that is not being used, and transmitting a confirmation message corresponding to the write data to the host system if the number of the used write buffer units of the write buffer units is smaller than the predefined value. The buffer memory accessing method further includes: temporarily storing the write data to one of the write buffer units that is not being used, and transmitting the confirmation message corresponding to the write data to the host system after a predefined time interval if the number of the used write buffer units of the write buffer units is not smaller than the predefined value.

An exemplary embodiment of the disclosure provides a memory controller for controlling a rewritable non-volatile memory module. The memory controller includes: a host interface coupled to a host system, a memory interface coupled to the rewritable non-volatile memory module, a buffer memory coupled to the host interface and the memory interface, and a memory management circuit coupled to the host interface, the memory interface, and the buffer memory. The buffer memory has a plurality of write buffer units. The memory management circuit receives a write data from the host system and determines whether a number of used write buffer units of the write buffer units is not smaller than a predefined value. If the number of the used write buffer units of the write buffer units is smaller than the predefined value, the memory management circuit temporarily stores the write data to one of the write buffer units that is not being used and transmits a confirmation message corresponding to the write data to the host system. If the number of the used write buffer units of the write buffer units is not smaller than the predefined value, the memory management circuit temporarily stores the write data to one of the write buffer units that is not being used and transmits the confirmation message corresponding to the write data to the host system after a predefined time interval.

An exemplary embodiment of the disclosure provides a memory storage device. The memory storage device includes a connection interface unit coupled to a host system, a rewritable non-volatile memory module, and a memory controller coupled to the connection interface unit and the rewritable non-volatile module. The memory controller includes a buffer memory, and the buffer memory has a plurality of write buffer units. The memory controller receives a write data from the host system and determines whether a number of used write buffer units of the write buffer units is not smaller than a predefined value. If the number of the used write buffer units of the write buffer units is smaller than the predefined value, the memory controller temporarily stores the write data to one of the write buffer units that is not being used and transmits a confirmation message corresponding to the write data to the host system. If the number of the used write buffer units of the write buffer units is not smaller than the predefined value, the memory controller temporarily stores the write data to one of the write buffer units that is not being used and transmits the confirmation message corresponding to the write data to the host system after a predefined time interval.

Accordingly, the buffer memory accessing method of the disclosure effectively reduces the time latency of the writing operation of the host system by adopting two-step writing, so as to effectively avoid an overly long waiting time in the writing operation of the host system when the buffer memory is full.

It should be understood, however, that this Summary may not contain all of the aspects and exemplary embodiments of the present disclosure, is not meant to be limiting or restrictive in any manner, and that the disclosure as disclosed herein is and will be understood by those of ordinary skill in the art to encompass obvious improvements and modifications thereto.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EXEMPLARY EMBODIMENTS

Figure 1A:
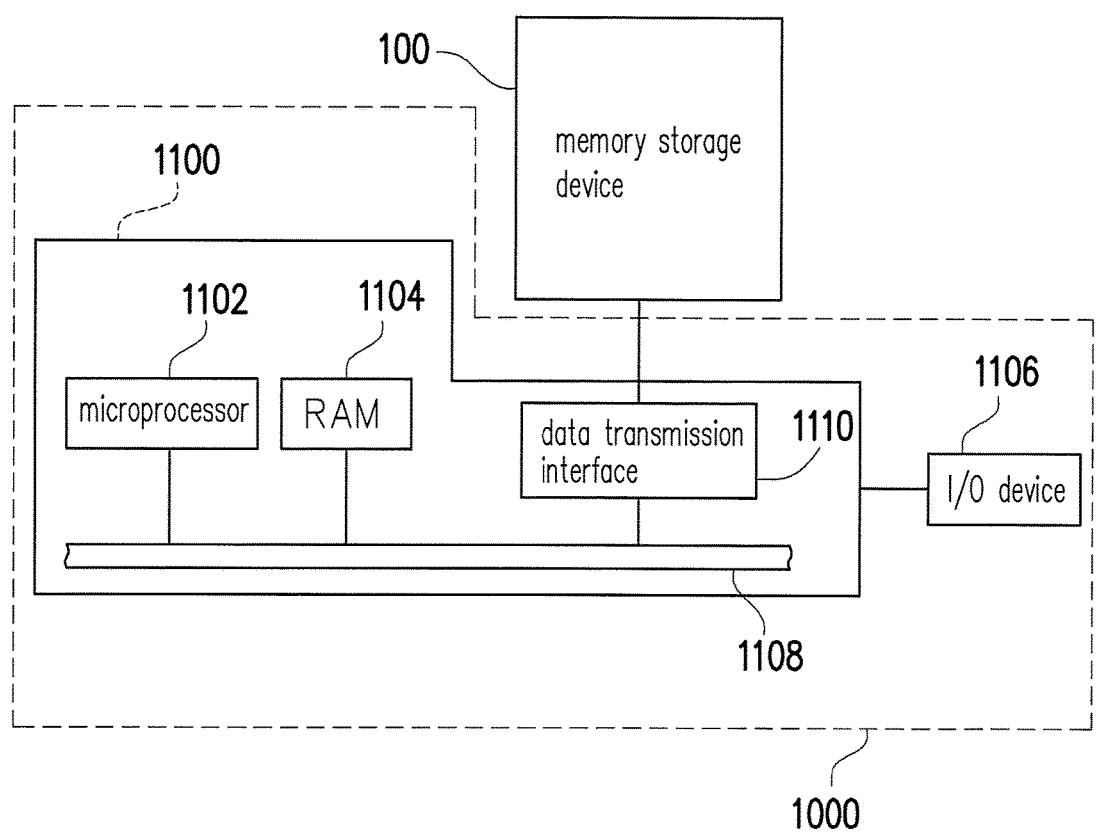
FIG. 1A is a schematic view illustrating a host system and a memory storage device according to an exemplary embodiment of the disclosure.

Reference will now be made in detail to the present preferred exemplary embodiments of the disclosure, examples of which are illustrated in the accompanying drawings. Wherever possible, the same reference numbers are used in the drawings and the description to refer to the same or like parts.

Exemplary embodiments of the present disclosure may include any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Figure 1B:
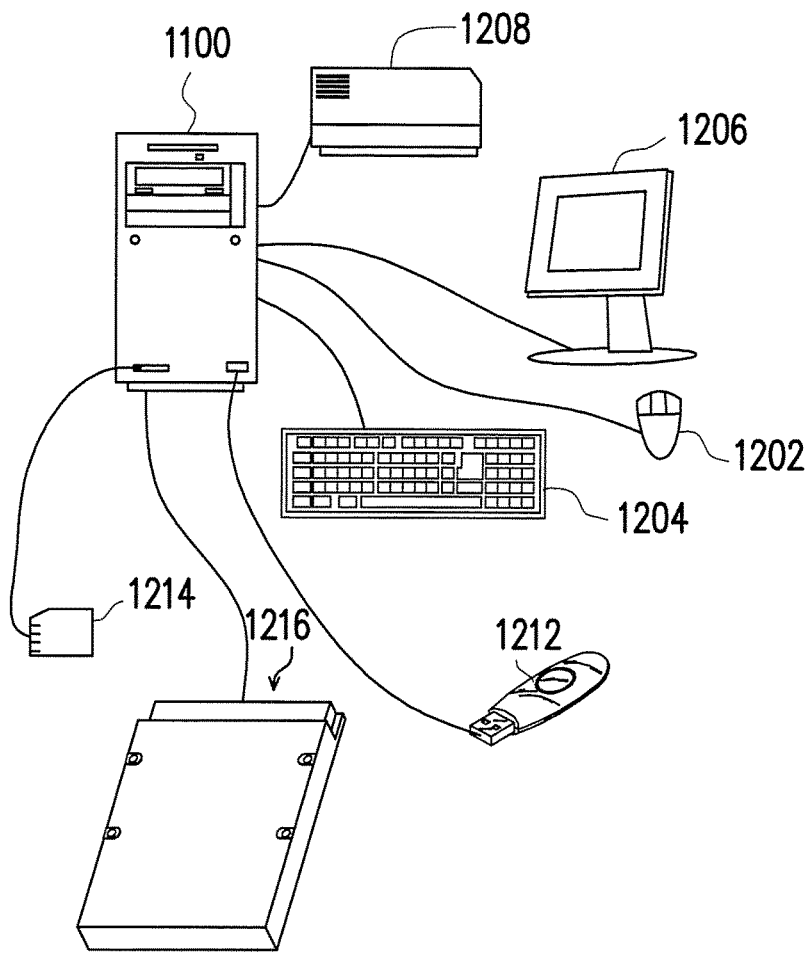
FIG. 1B is a schematic view illustrating a computer, an input/output device, and a memory storage device according to an exemplary embodiment of the disclosure.
Figure 1C:
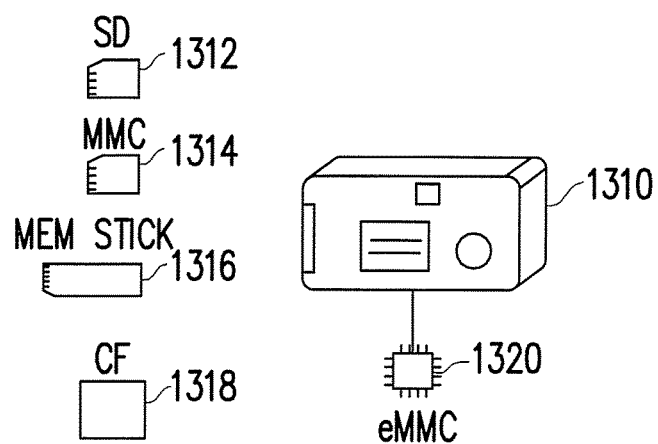
FIG. 1C is a schematic view illustrating a host system and a memory storage device according to an exemplary embodiment of the disclosure.

FIG. 1A is a schematic view illustrating a host system and a memory storage device according to an exemplary embodiment of the disclosure. FIG. 1B is a schematic view illustrating a computer, an input/output device, and a memory storage device according to an exemplary embodiment of the disclosure. FIG. 1C is a schematic view illustrating a host system and a memory storage device according to an exemplary embodiment of the disclosure.

Referring to FIG. 1A, a host system 1000 includes a computer 1100 and an input/output (I/O) device 1106. The computer 1100 includes a microprocessor 1102, a random access memory (RAM) 1104, a system bus 1108, and a data transmission interface 1110. The I/O device 1106 includes a mouse 1202, a keyboard 1204, a display 1206 and a printer 1208 as shown in FIG. 1B. It should be understood that the devices illustrated in FIG. 1B are not intended to limiting the I/O device 1106, and the I/O device 1106 may further include other devices.

According to an exemplary embodiment, a memory storage device 100 is electrically connected with other devices of the host system 1000 through the data transmission interface 1110. Through operations of the microprocessor 1102, the random access memory (RAM) 1104 and the I/O device 1106, data may be written into or read from the memory storage device 100. For instance, the memory storage device 100 may be a rewritable non-volatile memory storage device, such as a flash drive 1212, a memory card 1214, or a solid state drive (SSD) 1216, as shown in FIG. 1B.

Generally speaking, the host system 1000 may substantially be any system collocated with the memory storage device 100 for storing data. Even though the host system 1000 is described as a computer system in this exemplary embodiment, in another exemplary embodiment of the disclosure, the host system 1000 may be a system such as a digital camera, a video camera, a telecommunication device, an audio player, or a video player, etc. For example, if the host system is a digital camera (video camera) 1310 shown in FIG. 1C, the rewritable non-volatile memory storage device is then a secure digital (SD) card 1312, a multimedia card (MMC) 1314, a memory stick 1316, a compact flash (CF) card 1318 or an embedded storage device 1320 (as shown in FIG. 1C) used by the digital camera (video camera) 1310. The embedded storage device 1320 includes an Embedded MMC (eMMC). It should be mentioned that the eMMC is directly coupled to a substrate of the host system.

Figure 2:
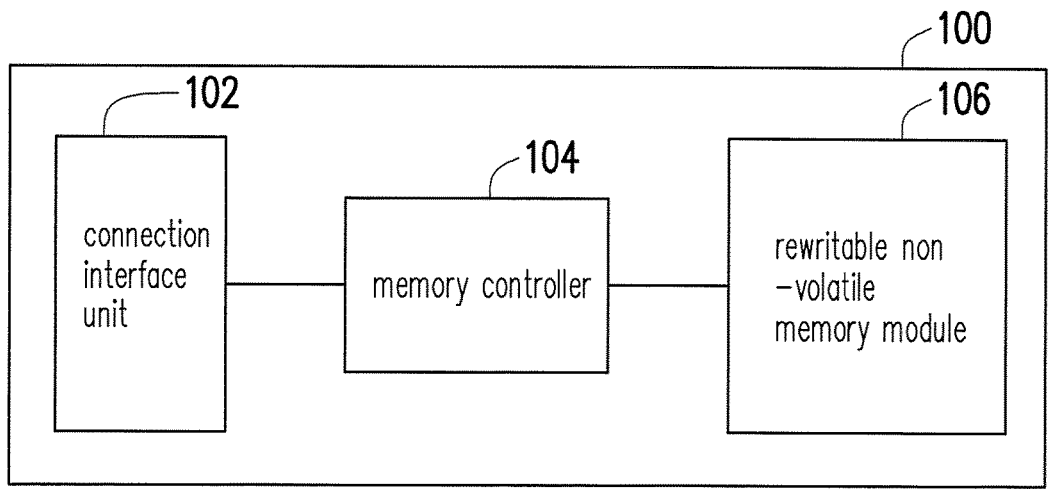
FIG. 2 is a schematic block view illustrating a memory storage device according to an exemplary embodiment of the disclosure.

FIG. 2 is a schematic block view illustrating a memory storage device according to an exemplary embodiment.

Referring to FIG. 2, the memory storage device 100 includes a connection interface unit 102, a memory controller 104, and a rewritable non-volatile memory module 106.

In this exemplary embodiment, the connection interface unit 102 is compatible with the secure digital (SD) interface standard. However, it should be understood that the disclosure is not limited thereto. The connection interface unit 102 may also be compatible with the parallel advanced technology attachment (PATA) standard, the Institute of Electrical and Electronic Engineers (IEEE) 1394 standard, the peripheral component interconnect express (PCI Express) standard, the universal serial bus (USB) standard, the ultra high speed-I (UHS-I) interface standard, the ultra high speed-II (UHS-II) interface standard, the serial advanced technology attachment (SATA) standard, the memory stick (MS) interface standard, the multimedia card (MMC) interface standard, the compact flash (CF) interface standard, the integrated device electronics (IDE) standard, or other suitable standards. In this exemplary embodiment, the connection interface unit 102 may be packaged in the same chip with the memory controller 104, or may be disposed outside a chip including the memory controller 104.

The memory controller 104 is configured for executing a plurality of logic gates or control commands implemented in a hardware form or in a firmware form, and performing various data operations, such as data writing, data reading data erasing, and data merging in the rewritable non-volatile memory module 106 according to the commands issued by the host system 1000.

The rewritable non-volatile memory module 106 is coupled to the memory controller 104 and is configured to store data written by the host system 1000. The rewritable non-volatile memory module 106 has a plurality of physical erasing units. For example, the physical erasing units may belong to the same or different dies. Each of the physical erasing units has a plurality of physical programming units. For example, in the exemplary embodiment of the disclosure, each of the physical erasing units includes 258 physical programming units, and the physical programming units belonging to the same physical erasing unit may be written independently but erased at the same time. However, it should be understood that the disclosure is not limited thereto. Each of the physical erasing units may also be formed of 64, 256, or an arbitrary number of physical programming units.

More specifically, a physical erasing unit is the minimal unit for erasing. In other words, each of the physical erasing units has a minimal number of memory cells that are erased together. A physical programming unit is the minimal unit of programming. In other words, the physical programming unit is the minimal unit for writing data. Each of the physical programming units usually includes a data bit area and a redundant bit area. The data bit area includes a plurality of physical access addresses to store user data, and the redundant bit area stores system data (e.g., control information and error correction code). In this exemplary embodiment, the data bit area of each of the physical programming units includes four physical access addresses, and a size of each physical access address is 512 bytes. However, in other exemplary embodiments, the data bit area may include more or fewer physical access addresses, and the disclosure does not intend to impose a limitation on a size and number of the physical access addresses.

In this exemplary embodiment, the rewritable non-volatile memory module 106 is a multi-level cell (MAC) BAND flash memory module (i.e., a flash memory module where each memory cell stores two data bits). However, the disclosure is not limited thereto. The rewritable non-volatile memory module 106 may also be a single level cell NAND flash memory module (i.e., a flash memory module where each memory stores one data bit), a trinary level cell (TLC) NAND flash memory module (i.e., a flash memory module where each memory cell stores three data bits), other flash modules or other memory modules having the same characteristics.

Figure 3:
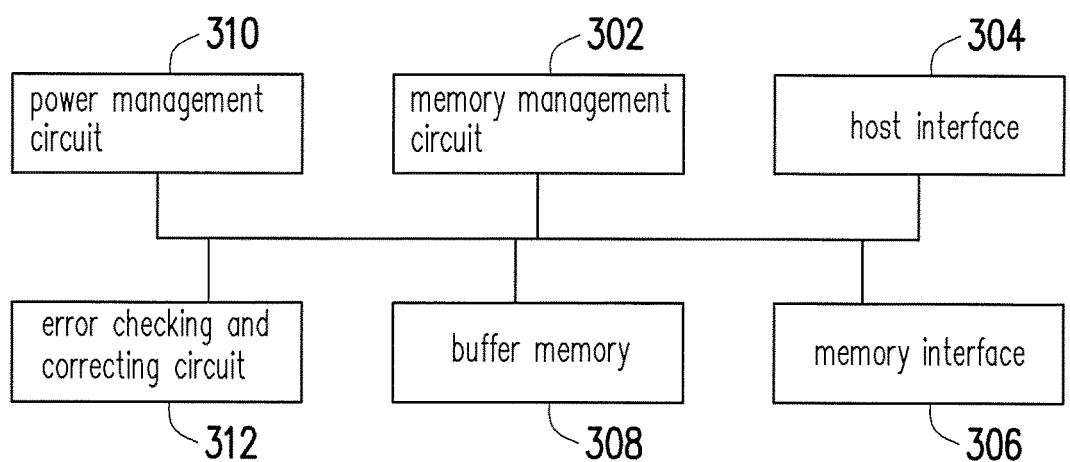
FIG. 3 is a schematic block view illustrating a memory controller according to an exemplary embodiment of the disclosure.

FIG. 3 is a schematic block view illustrating a memory controller according to an exemplary embodiment of the disclosure. It should be understood that the memory controller illustrated in the FIG. 3 is merely exemplary, and the disclosure is not limited thereto.

Referring to FIG. 3, the memory controller 104 includes a memory management circuit 302, a host interface 304, a memory interface 306, and a buffer memory 308.

The memory management circuit 302 is configured for controlling an overall operation of the memory controller 104. Specifically, the memory management circuit 302 has a plurality of control commands. When the memory storage device is operated, the control commands are executed to perform various data operations such as data writing, data reading, data erasing, and data merging, etc.

In this exemplary embodiment, the control commands of the memory management circuit 302 are implemented in a firmware form. For instance, the memory management circuit 302 has a microprocessor (not shown) and a read-only memory (not shown), and the control commands are burnt into the read-only memory. When the memory storage device 100 is operated, the control commands are executed by the microprocessor for various data operations, such as data writing, data reading data erasing, and data merging.

According to another exemplary embodiment of the disclosure, the control commands of the memory management circuit 302 may also be stored in a specific area (for example, the system area in the memory module exclusively used for storing system data) of the rewritable non-volatile memory module 106 as program codes. Moreover, the memory management circuit 302 has a microprocessor (not shown), a read-only memory (not shown), and a random access memory (not shown). Specifically, the read-only memory has a boot code. When the memory controller 104 is enabled, the boot code is first executed by the microprocessor for loading the control commands stored in the rewritable non-volatile memory module 106 into the random access memory of the memory management circuit 302. Afterwards, the microprocessor unit executes the control commands to perform various data operations such as data writing, data reading, data erasing, and data merging.

Additionally, according to another exemplary embodiment of the disclosure, the control commands of the memory management circuit 320 may be implemented in a hardware form. For example, the memory management circuit 302 includes a microcontroller, a memory cell management circuit, a memory writing circuit, a memory reading circuit, a memory erasing circuit, and a data processing circuit. The memory management circuit, the memory writing circuit, the memory reading circuit, the memory erasing circuit, and the data processing circuit may be electrically connected to the microcontroller. The memory cell management unit is configured for managing the physical erasing units of the rewritable non-volatile memory module 106. The memory writing circuit is configured for transmitting a write command to the rewritable non-volatile memory module 106 to write data into the rewritable non-volatile memory module 106. The memory reading circuit is configured for transmitting a read command to the rewritable non-volatile memory module 106 to read data from the rewritable non-volatile memory module 106. The memory erasing circuit is configured for transmitting an erase command to the rewritable non-volatile memory module 106 to erase data from the rewritable non-volatile memory module 106. The data processing circuit is configured for processing both data to be written into the rewritable non-volatile memory module 106 and data to be read from the rewritable non-volatile memory module 106.

The host interface 304 is electrically connected to the memory management circuit 302 and configured to receive and identify a command and data transmitted by the host system 1000. In other words, the command and data transmitted by the host system 1000 is transmitted to the memory management circuit 302 through the host interface 304. In this exemplary embodiment, the host interface 304 is compatible with the SD standard. However, it should be understood that the disclosure is not limited thereto. The host interface 304 may also be compatible with the PATA standard, the IEEE 1394 standard, the PCI Express standard, the USB standard, the UHS-I interface standard, the UHS-II interface standard, the SATA standard, the MS standard, the MMC standard, the CF standard, the IDE standard, or other suitable data transmission standards.

The memory interface 306 is coupled to the memory management circuit 302 for accessing the rewritable non-volatile memory module 106. In other words, data desired to be written into the rewritable non-volatile memory module 106 are converted into a format acceptable to the rewritable non-volatile memory module 106 by the memory interface 306. For instance, if the memory management circuit 302 is about to access the rewritable non-volatile memory module 106, the memory interface 306 transmits a corresponding command sequence. The corresponding command sequences may include one or more signals or data on the bus. For instance, a reading command sequence may include reading identification codes, memory addresses, and so forth.

The buffer memory 308 is coupled to the memory management circuit 302, the host interface 304, and the memory interface 306.

Figure 4:
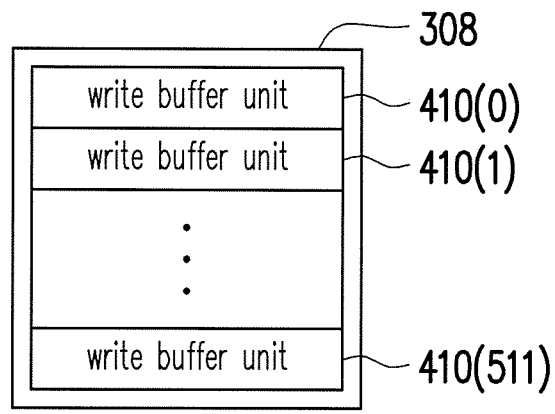
FIG. 4 is a schematic view illustrating a buffer memory according to an exemplary embodiment of the disclosure.

FIG. 4 is a schematic view illustrating a buffer memory according to an exemplary embodiment of the disclosure.

Referring to FIG. 4, in this exemplary embodiment, the buffer memory 308 has 512 write buffer units (i.e., write buffer units 410(0) to 410(511)), and a size of each of the write buffer units is 4 KB. In addition, the host system 1000 transmits data with 4 KB as a unit. Moreover, in this exemplary embodiment, a size of four write buffer units corresponds to a size of a physical programming unit of the rewritable non-volatile memory. However, it should be understood that the exemplary embodiment does not intend to limit the number of the write buffer units in the buffer memory 308, the size of the write buffer unit, and the size of the data transmitted by the host system 1000. In other exemplary embodiments, the number of the write buffer units in the buffer memory 308 may be more or less than 512, and the size of the write buffer unit and the size of the data transmitted by the host system 100 may be more or less than 4 KB.

The write buffer units 410(0) to 410(511) are configured to temporarily store the data and command that are from the host system 1000 and to be written to the rewritable non-volatile memory module 106, or data from the rewritable non-volatile memory module 106. Besides, the write buffer units 410(0) to 410(511) may also be configured as a temporary storage area of data in the memory storage device 100 when the memory controller 104 (or the memory management circuit 302) performs a background task. For example, the background task may be at least one of tasks such as saving a mapping table, a garbage collection, and/or an error correction, etc.

Referring to FIG. 3 again, in an exemplary embodiment of the disclosure, the memory controller 104 further includes a power management circuit 310 and an error checking and correcting circuit 312.

The power management circuit 310 is coupled to the memory management circuit 302 and configured for controlling power of the of the memory storage device 100.

The error checking and correcting circuit 312 is coupled to the memory management circuit 302 and configured for performing an error checking and correcting process to ensure an accuracy of data. More specifically, when the memory management circuit 302 receives a write command from the host system 1000, the error checking and correcting circuit 312 may generate an error checking and correcting code (ECC code) in correspondence with the data of the write command, and the memory management circuit 302 may write the data corresponding to the write command and the corresponding ECC code into the rewritable non-volatile memory module 106. Then, when the memory management circuit 302 reads the data from the rewritable non-volatile memory module 106, the ECC code corresponding to the data is also read, and the error checking and correcting circuit 312 may execute an error checking and correcting process to the read data according to the ECC code.

FIGS. 5A to 5D are schematic views illustrating a method of accessing a buffer memory according to an exemplary embodiment of the disclosure.

Referring to FIGS. 5A to 5D, it should be understood that, in the normal accessing of the buffer memory 308, when the host system 100 performs a write operation, the memory controller 104 (or the memory management circuit 302) temporarily stores the write data of the writing operation to at least one write buffer unit that is not yet used in the buffer memory 308. When the write data is successfully stored in the buffer memory 308, the memory controller 104 (or the memory management circuit 302) transmits a confirmation message to the host system 1000 to notify the host system 1000 that the write operation is completed. However, when all the write buffer units 410(0) to 410(511) are used, the write data from the host system 1000 are unable to be timely written to the buffer memory 308, and a time latency of the host system 1000 may be increased.

To avoid an overly long time latency that may result in a time out, in this exemplary embodiment, when a predefined space in the write buffer units 410(0) to 410(511) is already used, the memory controller 104 (or the memory management circuit 302) may lower a frequency of writing data to the buffer memory 308. For example, when the number of the write buffer units that are used is smaller than a predefined value and a data needs to be temporarily stored to the buffer memory 308, the memory controller 104 (or the memory management circuit 302) may directly temporarily store the data to the write buffer units 410(0) to 410(511). When the number of the write buffer units that are used is greater than or equal to the predefined value and a data needs to be temporarily stored to the buffer memory 308, the memory controller 104 (or the memory management circuit 302) may use the write buffer units 410(0) to 410(511) according to a predefined time interval.

Here, the predefined time interval is set as a longest time latency allowed by the host system 1000, such as 10 ms. In addition, the memory controller 104 (or the memory management circuit 302) records an execution time of each background task of the memory storage device 100, and records the longest execution time (also referred to as "first execution time" in the following). For example, the background task with the longest execution time is the task of saving a mapping table, and the execution time thereof is 1280 ms. The memory controller 104 (or the memory management circuit 302) sets the predefined value according to the predefined time interval and the first execution time. Specifically, in this exemplary embodiment, the memory controller 104 (or the memory management circuit 302) divides the first execution time with the predefined time interval to obtain a first value and set a value obtained by subtracting the first value from the number of the write buffer units as the predefined value.

For example, in an example where the first execution time is 1280, the predefined time interval is 10, and the number of write buffer units is 512, the first value is 128 (i.e., 1280/10=128), and the predefined value is 384 (i.e., 512−128=384). In other words, the memory controller 104 (or the memory management circuit 302) may keep 128 write memory buffer units in the buffer memory 308 for regulating data writing of the host system 1000. It should be understood that "keep 128 write memory buffer units in the buffer memory 308" does not refer to keeping 128 specific write buffer units, but that when there are only 128 write buffer units that are not used in the buffer memory 308, the 128 write buffer units are merely used to receive the write data from the host system 1000, so as to regulate the write operation of the host system 1000 and avoid an overly long write time latency of the host system 1000.

Figure 5A:
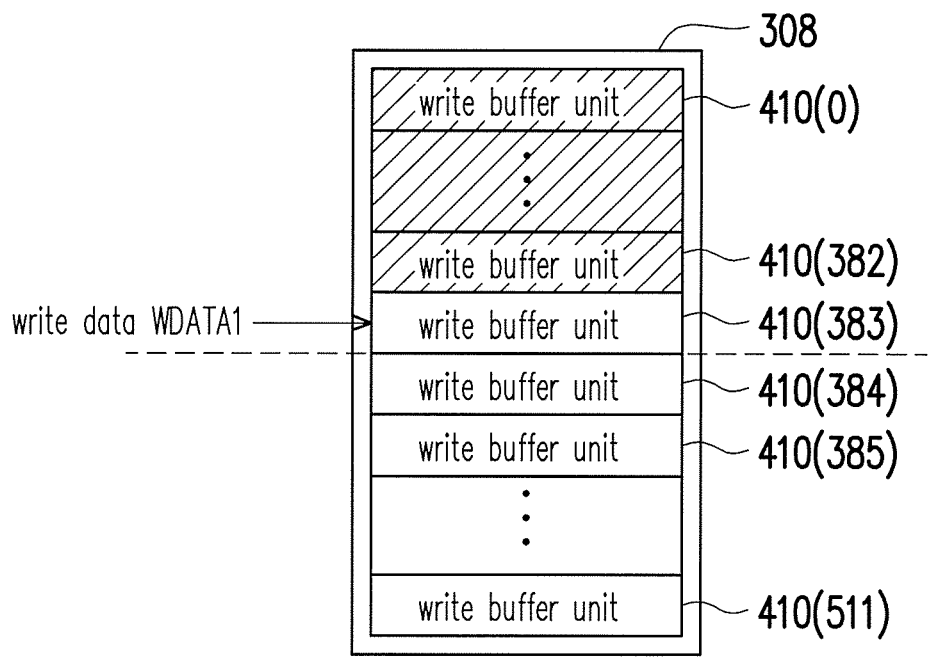
FIGS. 5A to 5D are schematic views illustrating a buffer memory accessing method according to an exemplary embodiment of the disclosure.

In this exemplary embodiment, when the memory controller 104 (or the memory management circuit 302) receives the write data from the host system 1000 and the number of the used write buffer units in the buffer memory 308 is smaller than the predefined value, the memory controller 104 (or the memory management circuit 302) writes the write data to the buffer memory 308 and directly replies the host system 1000 with the confirmation message corresponding to the write data. When the memory controller 104 (or the memory management circuit 302) receives the write data from the host system 1000 and the number of the used write buffer units in the buffer memory 308 is not smaller than the predefined value, the memory controller 104 (or the memory management circuit 302) writes the write data to the buffer memory 308 and replies the host system 1000 with the confirmation message corresponding to the write data after the predefined time interval. As shown in FIG. 5A, it is assumed that the number of the currently used write buffer units of the buffer memory 308 is 383 (e.g., the used write buffer units are the write buffer units 410(0) to 410(382)). When the memory controller 104 (or the memory management circuit 302) receives write data WDATA1 from the host system 1000, the memory controller 104 (or the memory management circuit 302) determines that the number of the currently used write buffer units in the buffer memory 308 is smaller than the predefined value (i.e., 384). Then, the memory controller 104 (or the memory management circuit 302) directly temporarily stores the write data WDATA1 of the write operation to a write buffer unit that is not being used (e.g., the write buffer unit 410(383)) and immediately transmits the confirmation message indicating that writing of the write data WDATA1 has been completed to the host system 1000. For example, the host system 1000 may then execute the next write operation.

Figure 5B:
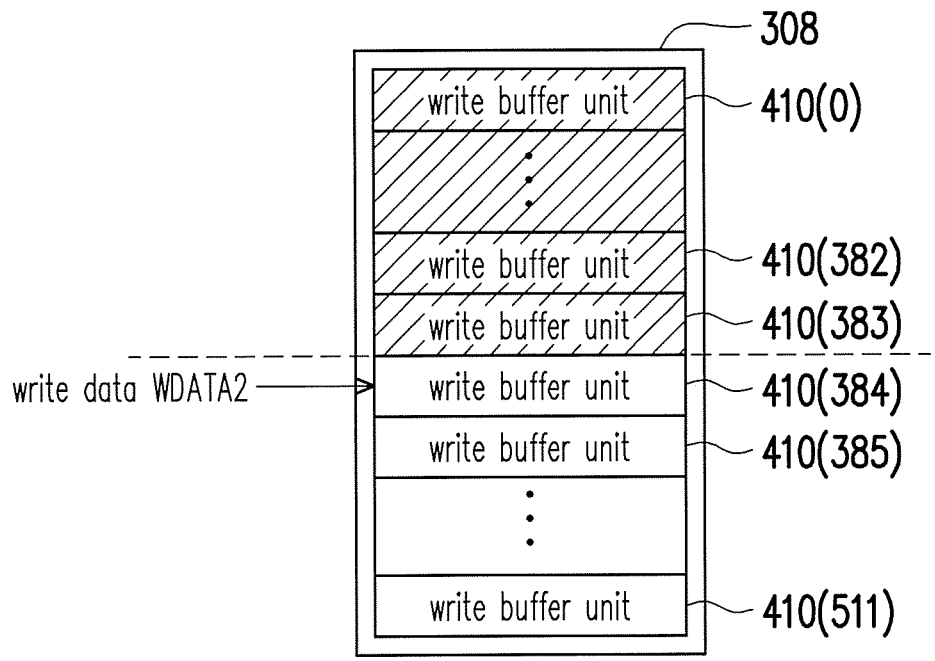

As shown in FIG. 5B, it is assumed that the number of the currently used write buffer units of the buffer memory 308 is 384 (e.g., the used write buffer units are the write buffer units 410(0) to 410(383)). When the memory controller 104 (or the memory management circuit 302) receives a write data WDATA2 from the host system 1000, the memory controller 104 (or the memory management circuit 302) determines that the number of the currently used write buffer units in the buffer memory 308 is not smaller than the predefined value (i.e., 384). Then, the memory controller 104 (or the memory management circuit 302) directly temporarily stores the write data WDATA2 of the write operation to a write buffer unit that is not being used (e.g., the write buffer unit 410(384)) and transmits the confirmation message indicating that the writing of the write data WDATA2 has been completed to the host system 1000 after the predefined time interval (i.e., 10 ms). In other words, when the number of the write buffer units is not smaller than the predefined value, the host system 1000 waits for the predefined time interval and then performs the next write operation after performing a write operation.

Figure 5C:
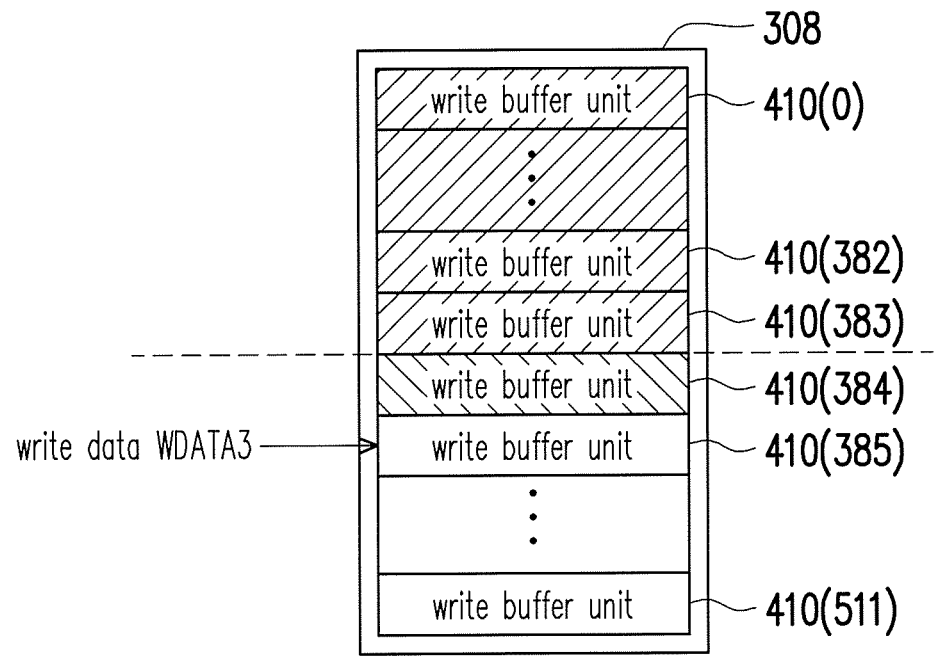

As shown in FIG. 5C, it is assumed that the number of the currently used write buffer units of the buffer memory 308 is 385 (e.g., the used write buffer units are the write buffer units 410(0) to 410(384)). When the memory controller 104 (or the memory management circuit 302) receives a write data WDATA3 from the host system 1000, the memory controller 104 (or the memory management circuit 302) determines that the number of the currently used write buffer units in the buffer memory 308 is not smaller than the predefined value (i.e., 384). Then, the memory controller 104 (or the memory management circuit 302) directly temporarily stores the write data WDATA3 of the write operation to a write buffer unit that is not being used (e.g., the write buffer unit 410(385)) and transmits the confirmation message indicating that writing of the write data WDATA3 has been completed to the host system 1000 after the predefined time interval.

Figure 5D:
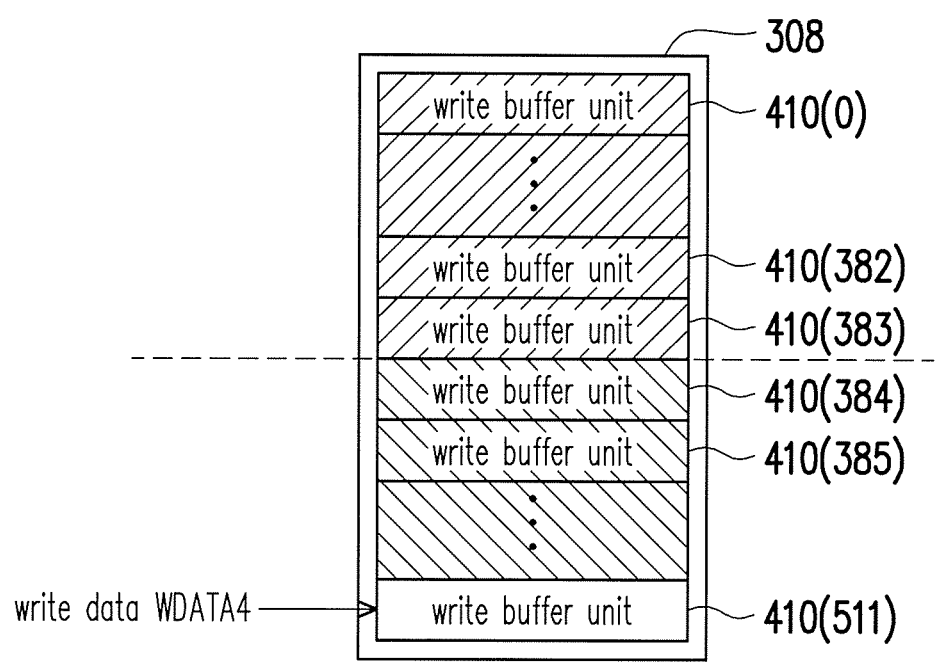

As shown in FIG. 5D, it is assumed that the number of the currently used write buffer units of the buffer memory 308 is 511 (e.g., the used write buffer units are the write buffer units 410(0) to 410(510)). When the memory controller 104 (or the memory management circuit 302) receives a write data WDATA4 from the host system 1000, the memory controller 104 (or the memory management circuit 302) determines that the number of the currently used write buffer units in the buffer memory 308 is not smaller than the predefined value (i.e., 384). Then, the memory controller 104 (or the memory management circuit 302) directly temporarily stores the write data WDATA4 of the write operation to a write buffer unit that is not being used (e.g., the write buffer unit 410(511)) and transmits the confirmation message indicating that the writing of the write data WDATA4 has been completed to the host system 1000 after the predefined time interval. It should be noted that, the write buffer units 410(0) to 410(511) of the buffer memory 308 are used, when all the background tasks of the rewritable non-volatile memory module 106 are completed, the memory controller 104 (or the memory management circuit 302) writes the data in all the write buffer units 410(0) to 410(511) to the rewritable non-volatile memory module 106, so as to remove the data in the write buffer units 410(0) to 410(511) to receive new write data from the host system 1000 or perform the background tasks.

Taking performing the task of saving a mapping table that requires an execution time of 1280 ms as an example, assuming that 384 write buffer units are currently used, and the used write buffer units 410(0) to 410(383) include the write buffer units used for the task of saving a mapping table that is performed by the memory controller 104 (or the memory management circuit 302) (i.e., the task of saving a mapping table is being performed), then when the host system 1000 intends to perform the write operations consecutively, as shown in FIGS. 5B to 5D, the host system 1000 waits for 10 ms and then performs the next write operation after performing a write operation, since the number of the write buffer units currently used is not smaller than 384. Therefore, when all the remaining 128 write buffer units (i.e., the write buffer units 410(384) to 410(511)) that are not used are used to store the write data consecutively written by the host system 1000, the total time required is also 1280 ms. Accordingly, when the write buffer units 410(384) to 410(511) are full, the background task (i.e., saving a mapping table) is also finished. At this time, the memory controller 104 (or the memory management circuit 302) writes the data in all the write buffer units 410(0) to 410(511) of the buffer memory 308 to the rewritable non-volatile memory module 106, so as to remove the data in the write buffer units 410(0) to 410(511) to receive new write data from the host system 1000 or perform other background task. In this way, the time out that occurs when the background task is being executed and all the write buffer units of the buffer area 308 are used while the host system performs the write operation may be avoided.

It should be understood that the figures shown in FIGS. 5A to 5D are merely provided for easy understanding. In another exemplary embodiment, the way that the memory controller 104 (or the memory management circuit 302) writes data to the write buffer units may not be in accordance with the way that the write buffer units 410(0) to 411(511) are arranged. Specifically, the memory controller 104 (or the memory management circuit 302) may arbitrarily use a part of the write buffer units that are not used in the buffer memory 308 to perform the background task, or arbitrarily write the write data of the host system 1000 to one of the write buffer units that are not used in the buffer memory 308. In addition, in an exemplary embodiment, the memory controller 104 (or the memory management circuit 302) determines whether to, after the write data from the host system 1000 is temporarily stored in the buffer memory 308, transmit the confirmation message of the write data to the host system 1000 after a predefined time interval according to the number of the currently used buffer units in the buffer memory 308 and the predefined value.

Figure 6:
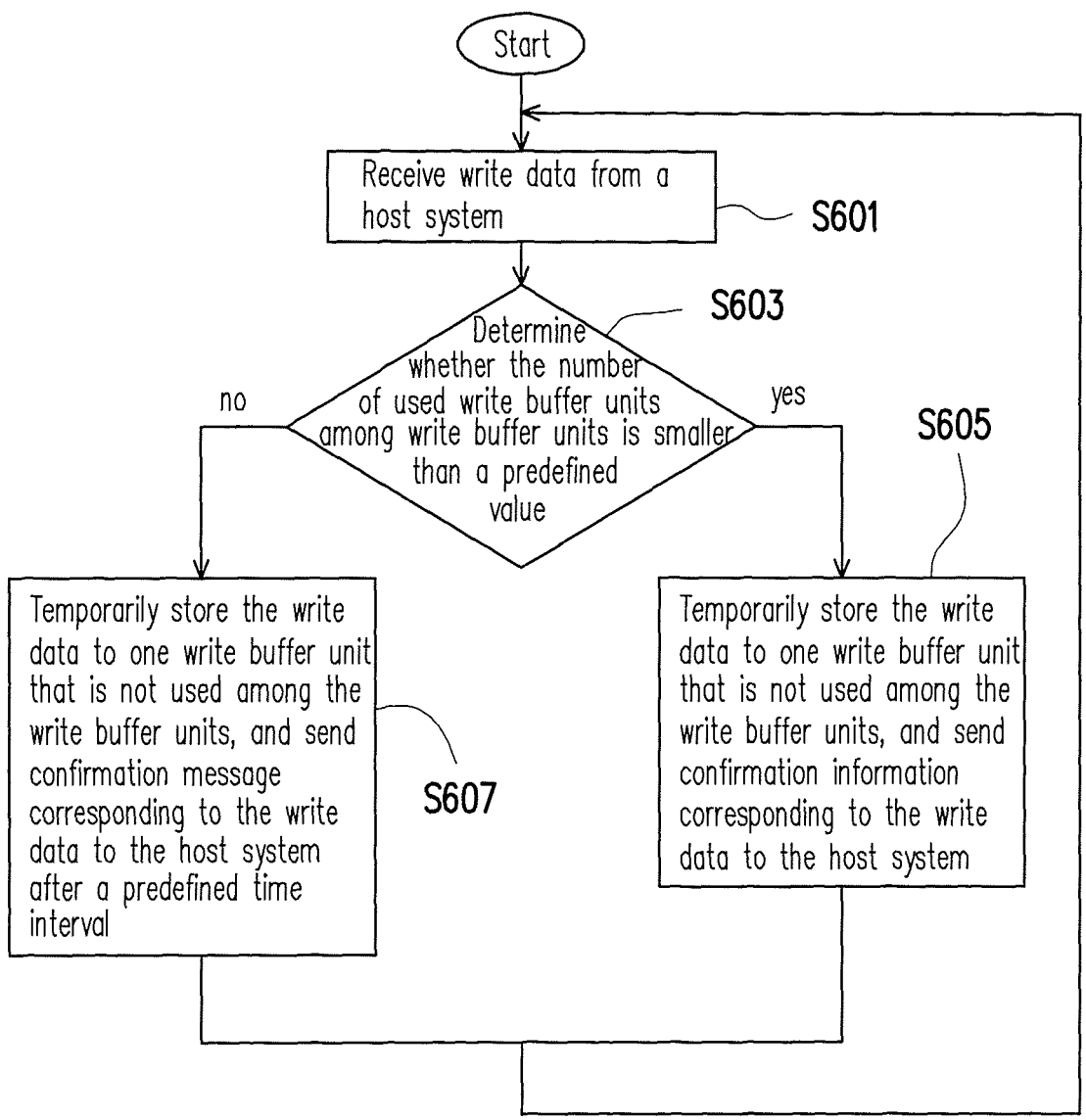
FIG. 6 is a flowchart illustrating a buffer memory accessing method according to an exemplary embodiment of the disclosure.

FIG. 6 is a flowchart illustrating a buffer memory accessing method according to an exemplary embodiment of the disclosure.

Referring to FIG. 6, At Step 601, the memory controller 104 (or the memory management circuit 302) receives a write data from the host system 1000. At Step 603, the memory controller 104 (or the memory management circuit 302) determines whether the number of the currently used write buffer units in the write buffer units 410(0) to 410(511) of the buffer memory 308 is smaller than a predefined value.

If, in the write buffer units 410(0) to 410(511) of the buffer memory 308, the number of the currently used write buffer units is smaller than the predefined value, at Step S605, the memory controller 104 (or the memory management circuit 302) temporarily stores the write data to one of the write buffer units that is not being used and transmits the confirmation message corresponding to the write data to the host system 1000.

If, in the write buffer units 410(0) to 410(511) of the buffer memory 308, the number of the currently used write buffer units is not smaller than the predefined value, at Step S607, the memory controller 104 (or the memory management circuit 302) temporarily stores the write data to one of the write buffer units that is not being used and transmits the confirmation message corresponding to the write data to the host system 1000 after a predefined time interval.

After the memory controller 104 (or the memory management circuit 302) transmits the confirmation message, if the host system 1000 receives the confirmation message transmitted at Step S605 or Step S607, the host system 1000 may transmit another write data and the memory controller 104 (or the memory management circuit 302) may perform Step S601 again to receive the another write data from the host system 1000.

In view of the foregoing, the disclosure provides a two-step accessing of the buffer memory. When the number of the used write buffer units in the buffer memory is smaller than the predefined value, the memory controller (or the memory management circuit) temporarily writes the write data to one of the write buffer units that is not being used and immediately reply the host system with the confirmation message of the write data. When the number of the used write buffer units in the buffer memory is not smaller than the predefined value, the memory controller (or the memory management circuit) temporarily stores the write data to one of the write buffer units that is not being used and reply the host system with the confirmation message of the write data after the predefined time interval. Accordingly, the time latency of the writing operation of the host system may be effectively reduced, so as to effectively avoid an overly long waiting time in the writing operation of the host system when the buffer memory is full. The previously described exemplary embodiments of the disclosure have the advantages aforementioned, wherein the advantages aforementioned not required in all versions of the disclosure.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A buffer memory accessing method, suitable for a buffer memory of a flash memory storage device, wherein the flash memory storage device comprises a rewritable non-volatile memory module, wherein the buffer memory has a plurality of write buffer units, the buffer memory accessing method comprising:
    receiving a write data from a host system;
    determining whether a number of used write buffer units of the write buffer units is not smaller than a predefined value;
    temporarily storing the write data to one of the write buffer units that is not being used and transmitting a confirmation message corresponding to the write data to the host system if the number of the used write buffer units of the write buffer units is smaller than the predefined value; and
    temporarily storing the write data to one of the write buffer units that is not being used and transmitting the confirmation message corresponding to the write data to the host system after a predefined time interval if the number of the used write buffer units of the write buffer units is not smaller than the predefined value.

2. The buffer memory accessing method as claimed in claim 1, further comprising:
    recording a plurality of execution times of a plurality of background tasks operated in the flash memory storage device, and recording a first execution time of the execution times, wherein the first execution time is not shorter than other execution times of the execution times, and the background tasks use a part of the write buffer units in the buffer memory; and
    setting the predefined value according to the first execution time and the predefined time interval.

3. The buffer memory accessing method as claimed in claim 2, further comprising:
    obtaining the predefined value by subtracting a first value from the number of the write buffer units, wherein the first value is obtained by dividing the first execution time with the predefined time interval.

4. The buffer memory accessing method as claimed in claim 1, further comprising:
receiving another write data from the host system and temporarily storing the another write data to the buffer memory after transmitting the confirmation message.

5. The buffer memory accessing method as claimed in claim 1, further comprising:
writing data in the write buffer units to the rewritable non-volatile memory module after all the write buffer units in the buffer memory are used.

6. The buffer memory accessing method as claimed in claim 2, wherein the background task comprises saving a mapping table, a garbage collection, and an error correction.

7. A flash memory controller for controlling a rewritable non-volatile memory module, the flash memory controller comprising:
a host interface, coupled to a host system;
a memory interface, coupled to the rewritable non-volatile memory module;
a buffer memory, coupled to the host interface and the memory interface, wherein the buffer memory has a plurality of write buffer units; and
a memory management circuit, coupled to the host interface, the memory interface, and the buffer memory, wherein the memory management circuit is configured to receive a write data from the host system and determine whether a number of used write buffer units of the write buffer units is not smaller than a predefined value,
wherein the memory management circuit temporarily stores the write data to one of the write buffer units that is not being used and transmits a confirmation message corresponding to the write data to the host system if the number of the used write buffer units of the write buffer units is smaller than the predefined value,
wherein the memory management circuit temporarily stores the write data to one of the write buffer units that is not being used and transmits the confirmation message corresponding to the write data to the host system after a predefined time interval if the number of the used write buffer units of the write buffer units is not smaller than the predefined value.

8. The flash memory controller as claimed in claim 7, wherein the memory management circuit records a plurality of execution times corresponding to a plurality of background tasks operated in the flash memory controller and records a first execution time of the execution times, wherein the first execution time is not shorter than other execution times of the execution times, wherein the background tasks use a part of the write buffer units of the buffer memory, wherein the memory management circuit sets the predefined value according to the first execution time and the predefined time interval.

9. The flash memory controller as claimed in claim 8, wherein the memory management circuit obtains the predefined value by subtracting a first value from the number of the write buffer units, and the first value is obtained by dividing the first execution time with the predefined time interval by the memory management circuit.

10. The flash memory controller as claimed in claim 7, wherein the memory management circuit receives another write data from the host system and temporarily stores the another write data to the buffer memory after the memory management circuit transmits the confirmation message.

11. The flash memory controller as claimed in claim 7, wherein the memory management circuit writes data in the write buffer units to the rewritable non-volatile memory module after all the write buffer units in the buffer memory are used.

12. The flash memory controller as claimed in claim 8, wherein the background tasks comprise saving a mapping table, a garbage collection, and an error correction.

13. A flash memory storage device, comprising:
a connection interface unit, coupled to a host system;
a rewritable non-volatile memory module; and
a flash memory controller, coupled to the connection interface unit and the rewritable non-volatile memory module, wherein the flash memory controller comprises a buffer memory, wherein the buffer memory has a plurality of write buffer units,
wherein the flash memory controller is configured to receive a write data from the host system and determine whether a number of used write buffer units of the write buffer units is not smaller than a predefined value,
wherein the flash memory controller temporarily stores the write data to one of the write buffer units that is not being used and transmits a confirmation message corresponding to the write data to the host system if the number of the used write buffer units of the write buffer units is smaller than the predefined value,
wherein the flash memory controller temporarily stores the write data to one of the write buffer units that is not being used and transmits the confirmation message corresponding to the write data to the host system after a predefined time interval if the number of the used write buffer units of the write buffer units is not smaller than the predefined value.

14. The flash memory storage device as claimed in claim 13, wherein the flash memory controller records a plurality of execution times corresponding to a plurality of background tasks operated in the flash memory storage device and records a first execution time of the execution times, wherein the first execution time is not shorter than other execution times of the execution times, wherein the background tasks use a part of the write buffer units of the buffer memory, wherein the flash memory controller sets the predefined value according to the first execution time and the predefined time interval.

15. The flash memory storage device as claimed in claim 14, wherein the flash memory controller obtains the predefined value by subtracting a first value from the number of the write buffer units, and the first value is obtained by dividing the first execution time with the predefined time interval by the flash memory controller.

16. The flash memory storage device as claimed in claim 13, wherein the flash memory controller receives another write data from the host system and temporarily stores the another write data to the buffer memory after the flash memory controller transmits the confirmation message.

17. The flash memory storage device as claimed in claim 13, wherein the flash memory controller writes data in the write buffer units to the rewritable non-volatile memory module after all the write buffer units in the buffer memory are used.

18. The flash memory storage device as claimed in claim 14, wherein the background tasks comprise saving a mapping table, a garbage collection, and an error correction.

* * * * *